Dec. 6, 1966　　　L. J. BANASZAK　　　3,289,978
CONTROL APPARATUS
Filed Sept. 30, 1963
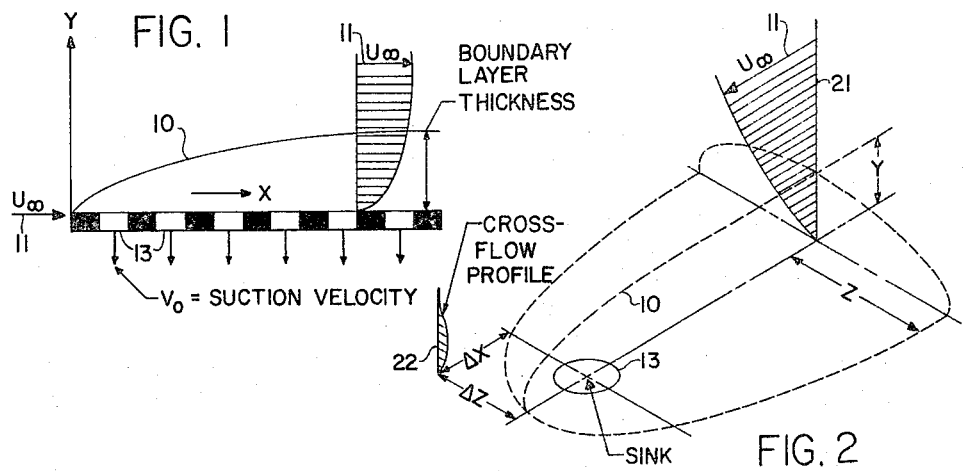
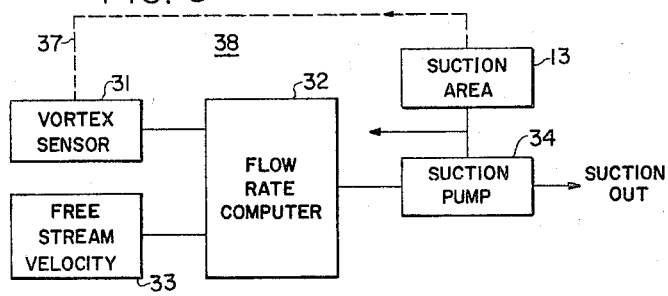
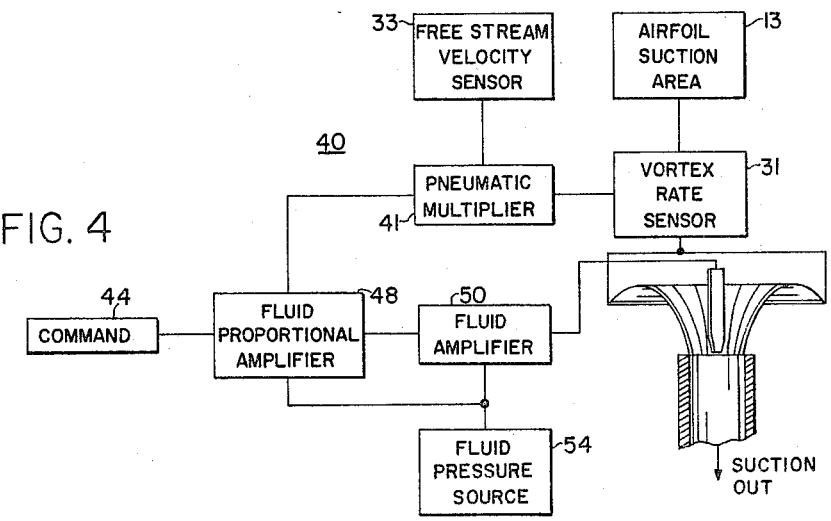
INVENTOR.
LLOYD J. BANASZAK
BY *Gordon Reed*
ATTORNEY United States Patent Office 3,289,978
Patented Dec. 6, 1966

3,289,978
CONTROL APPARATUS
Lloyd J. Banaszak, Wayzata, Minn., assignor to Honeywell Inc., a corporation of Delaware
Filed Sept. 30, 1963, Ser. No. 315,109
14 Claims. (Cl. 244—42)

This invention relates to dirigible craft such as aircraft having airfoil bodies, that is, bodies so shaped and arranged on the craft that when the craft is in motion relative to a fluid stream, the airfoil bodies are subjected to an aerodynamic lifting force in a direction transverse to the direction of relative movement of the craft and fluid stream.

The invention is further concerned with boundary layer control systems for airfoils. The invention in a sense pertains to the control in attitude of an aircraft utilizing boundary layer techniques wherein suction is applied to an aperture suitably located in an airfoil surface such as a wing to vary the relative lift on opposed wings of a craft to control attitude thereof, for example, about its roll axis.

The application of suction to the aperture in the surface of the airfoil or apertures in the airfoil results in decrease in thickness of the boundary layer thereby improving its aerodynamic properties such as lift.

The invention with more particularity is concerned with optimizing the thickness of the boundary layer for an airfoil surface by the utilization of a closed loop system which includes a sensor responsive to changes in the boundary layer condition resulting from the application of suction to the aperture or apertures.

The invention is concerned further with pure fluid control techniques applied to provide closed loop control of the boundary layer to thus derive control moments for vehicle control.

For a better understanding of the invention, reference may be had to the following detailed description thereof taken in conjunction with the accompanying figures of the drawing in which:

FIGURE 1 is a diagram of a boundary layer thickness curve for a typical airfoil surface;

FIGURE 2 is a diagram of a suction flow envelope for an isolated hole for an airfoil having an aperture, with the boundary velocity profile, the three dimensional cross flow velocity profile, and the suction flow envelope for an isolated aperture represented;

FIGURE 3 is a block diagram of one embodiment of the invention; and

FIGURE 4 is a block diagram of an alternative embodiment of the invention.

In the subject invention, the aerodynamic properties of an airfoil are modified by reduction of the thickness of the boundary layer thereof, thus causing the air over the wing to approximate the free stream velocity. The determination when the boundary layer thickness is at its optimum is provided by the application of suction to apertures in the airfoil, and sensing when air cross flow relative to such apertures indicates that the velocity of suction or suction velocity relative to the free air stream velocity is too great. More specifically a closed loop system controlled by a suction velocity responsive sensor affects the magnitude of the applied suction until the desired or optimum removal of decelerated fluid particles from the boundary layer before they cause separation, is obtained.

Referring to FIGURE 1, a boundary layer thickness curve 10 for an airfoil surface is shown along with a vector 11 representing the free stream air velocity. At a station or section of the airfoil, a velocity profile of the boundary layer is shown wherein the velocity relative to the airfoil varies from the freestream velocity at a point remote from the surface to zero at the surface. The airfoil is provided with various suction apertures 13 with each aperture having applied thereto an indicated suction velocity, $V_0$.

It will be appreciated that in the drawings, the thickness of the boundary layer as well as the boundary layer control aperture has been exaggerated for the purpose of ease of showing.

A peculiarity associated with suction applied to the boundary layer is produced by imperfections in the porous surface of the airfoil and spacing of the suction lead in holes 13 on the airfoil surface. This peculiarity is such that maximum and minimum suction quantities for each airfoil configuration must be observed if desired laminar flow is to be maintained. If the suction is less than a minimum or more than a maximum, the three-dimensional characteristics of the flow into each hole or aperture will cause premature transition in the nature of the air flow and the air flow over the wing becomes turbulent. As long as the maximum and minmum criticals are observed, however, suction can be helpful in reducing drag and increasing lift of the airfoil. The concept of these peculiarities can best be understood by considering the case of an isolated suction hole, FIGURE 2.

In FIGURE 2 the airfoil is considered with respect to a single aperture 13, often referred to as a sink. A velocity profile graph 21 showing the various relative speeds at points of a boundary layer is also represented. In addition to the profile 21 showing the velocities in the boundary layer, a three dimensional cross flow profile 22 for aperture 20 and the suction flow envelope are also illustrated. The net result of such cross flow is a vortexing type of flow action through aperture 13. Vortex strength depends upon a number of items such as free stream velocity, cross-flow velocity suction rate, hole size, hole spacing, etc.

An isolated or independent free trailing vortex produced by proper suction rates to the apertures results in little effect on laminar surface conditions. However, at higher free stream velocities and at the same suction rate, the flow envelope will become elongated in the direction of the free stream and cross-flows overlap that respect to the flow over the airfoil takes place as would normally be expected despite or not withstanding suction. Also, if suction is above the allowed maximum, the flow envelope widens in the direction at right angle to the direction of the free stream and cross-flows overlap that of the adjacent holes and early transition can be expected. Thus, if the envelope lengthens or widens transition in the flow can be expected. Suction should be increased in the first case, but decreased in the second.

For any fixed aerodynamic design employing open loop suction, i.e., a fixed amount of suction, boundary layer control will provide an increase in effeciency of the airfoil at only a certain air speed or only a small range of air speed. However, if continuous suction flow rate control (closed loop control) is provided, such efficiency could be obtained at much larger ranges of air speed. In other words, if the suction rate is fixed, the range of efficiency is considerably smaller than in a closed loop system wherein the suction rate can be varied with airspeed, to maintain the optimum flow envelope which is not elongated in either the direction of the free stream or at right angle thereto.

One possible arrangement for closed loop control would be that shown in FIGURE 3, wherein a vortex rate sensor 31 in just one of the inlet suction holes 13 for a given control surface area or airfoil surface area provides an input to a computer or integrator 32 which also receives from a second input device 33 the free stream velocity. The ratio of suction velocity $V_0$ to $U\infty$ of free stream velocity has been established as 0.0018. Thus, by comparing the free stream velocity U∞ with the suction velocity, the cross-flow could be determined. Knowing that cross-flow is proportional to the suction rate, the computer 32 modifies the operation of suction pump 34 which applies suction to area 13. Thus, closed loop suction rate control which can vary the suction rate is obtained.

In FIGURE 3, the computer 32 may be in the form of an integrator receiving inputs from a vortex rate sensor 31 providing an electrical signal and a second input from a free stream velocity device 33. The device 33 merely serves to change the gain of the integrator 32 which in turn adjusts the pumping rate of suction pump 34. The vortex rate sensor 31 may be of the type disclosed in U.S. Patent 3,203,237 to Harvey D. Ogren. The integrator 32 will continue to operate as long as the vortex rate sensor 31 indicates the existence of a vortex.

Integrators of the type suitable herein are old in the art as are also arrangements for varying the gain of such integrators. One type of integrator may be of the motor operated type wherein its rotation rate is dependent upon the magnitude of an electrical input signal. Such integrator includes a velocity signal generator, and the output therefrom is applied in feedback relation and opposed to the input signal to limit the motor rotation rate. The gain adjusting device 33 may be utilized to vary the magnitude of the velocity signal fed back to the input to the integrator to vary the motor rate for any given input signals to thereby vary the gain of the integrator.

It will be readily apparent that the suction pump 34 may be provided with means for disabling it from applying suction to area 13 so that if an arrangement were provided in each wing of an aircraft, a control movement would be provided relative to the longitudinal axis for relatively increasing the lift of one wing relative to the other whereby banking of the craft could be obtained for controlling the attitude.

FIGURE 4 is a schematic of a pure fluid or all fluid closed loop boundary layer control system 40 in the sense that control signals and the power controlled are fluids. In said system, which coacts with an aperture 13 in which vortex flow may occur, there is again provided a fluid responsive vortex rate sensor 31 which in this case may be similar to a portion to that sensor disclosed in the prior application of Richard J. Reilly, Serial No. 156,613, wherein a ring of fluid travels from the periphery of a circular porous element to a central sink. If the porous element be rotated, the ring of fluid has an angular momentum and the angular velocity of the fluid increases as it approaches the sink. Such increase or amplification of fluid particle velocity is used to develop an angular rate signal. The arrangement herein merely utilizes the sink and pressure pickoff thereof positioned along the flow through aperture 13.

The fluid type differential pressure output from sensor 31 is supplied to a scheduler or pneumatic multiplying or dividing device 41. Computing device 41 in addition to the pneumatic signals from sensor 31 also receives a pneumatic control effect from a flight condition sensor such as a free stream velocity responsive sensing device, 33 responsive to dynamic air pressure on the craft. The multiplier 41 is of the type which has no output if the output of either sensor 31 or sensor 33 is zero. The output from multiplier 41 derived from sensor 31 is modified by sensor 33 so as to change the gain of sensor 31 in multiplier 41.

The pneumatic output from multiplier 41 is in turn supplied to a fluid type signal summing amplifier 48. Fluid amplifiers generally are well known, see U.S. Patent 3,001,539 to Hurvitz, as well as other patents, and have a supply port and control ports. Signal summing fluid amplifier 48 also receives at a control port a differential pneumatic signal from an input command device 44 which may be used to set up a desired ratio of free stream and vortex velocity which is manually adjustable. The magnitude of the fluid output from amplifier 48 is proportional in magnitude to the sum of the two fluid type signals supplied thereto and thus it is not of an on-off type as in FIGURE 3 of Hurvitz. Its output in turn is supplied to a control port of a second fluid amplifier 50. The fluid amplifier 50 which is a proportional power amplified in turn controls a fluid type jet pump 34 of the ejector type which in turn supplied suction to area 13 through the vortex sensor 31. Such suction is proportional to an error which varies as the actual vortex rate varies from the desired rate.

The supply pressure source 54 for fluid amplifier 50 as well as for amplifier 48 may be derived from a conduit exposed to the dynamic air stream or may be supplied by a jet engine bleedoff if preferable.

While device 44 may be adjusted to provide laminar flow, it also may be adjusted to provide turbulent flow.

It will now be apparent that there has been provided a moment producing arrangement for an aircraft through which, by controlling laminar flow or turbulent flow by boundary layer techniques, an effective change in attitude aircraft and thus control thereof in attitude is achieved. While the invention has been shown as applicable to airfoil surfaces such as the wings of an aircraft, it is clear that it also may be applied to airfoils other than wing surfaces. Such other airfoil to which the invention is applicable are aircraft stabilizers or the like in which case the change force resulting is exerting in the side ways or horizontal direction.

What I claim is:

1. In a moment producing arrangement for an airfoil having an aperture in the surface thereof and means for applying suction to such aperture, in combination a vortex flow responsive sensor associated with the flow through said aperture and thus responsive to chord-wise flow and cross-flow of the air relative to said airfoil surface, and control means controlled by the vortex responsive sensor controlling the suction rate of said suction applying means.

2. In apparatus of claim 1, wherein said control means comprises an integrator controlled by the vortex flow responsive sensor and adjusting the suction rate so as to reduce the input to the integrator to zero.

3. The apparatus of claim 2 wherein said integrator is of the motor operated type and includes free airstream velocity means for changing the gain thereof, that is its operation rate, for a given input signal from the vortex flow responsive sensor.

4. In an airfoil boundary layer control system for an airfoil body having at least one aperture in the surface thereof, and comprising means applying suction to said aperture for the removal of decelerated air particles from the boundary layer; in combination: a vortex rate sensor responsive to the cross-flow and the chord-wise flow of air over said airfoil; and means including an integrator responsive to said rate sensor and controlling the operation rate of said suction applying means.

5. In an airfoil boundary layer control apparatus for an airfoil body having an aperture in the surface thereof and comprising pumping means controlling the flow of air through such aperture: senor means comprising a signal providing means associated with said aperture responsive to vortex action due to change in air flow through said aperture, further means selecting desired vortex action means for adjusting the flow rate of said pumping means, and means for controlling said last named means from said sensor and said further means.

6. A boundary layer control apparatus for an aircraft having at least one wing on each side of a fuselage thereof, each wing having an aperture therein to which suction may be applied for removal of decelerated fluid particles from the fluid boundary layer of such wing surface, a vortex angular rate sensor in the suction line of each aperture, means for controlling the magnitude of suction applied to such aperture, and means controlling said last means from said sensor.

7. An airfoil boundary layer control apparatus for an airfoil having an aperture therein, comprising a fluid suction jet pump applying suction to said aperture, a vortex angular rate sensor responsive to the vortex flow action associated with the flow of air through said aperture, a proportional, fluid signal summing amplifier, having an output proportional to its input, means supplying a differential pressure input signal to said summing amplifier, means for supplying a differential pressure signal from said vortex sensor to said summing amplifier, a second proportional, power, fluid amplifier controlled by said first fluid amplifier, means supplying a fluid to said second fluid amplifier from a jet engine bleedoff, and means controlling said fluid suction jet pump from said second fluid amplifier.

8. In an airfoil boundary layer control apparatus for an aircraft, the airfoil having at least one aperture in the surface thereof and including means applying suction to said aperture for the removal of the accelerated air particles from the boundary layer, in combination: a sensor responsive to the vortex flow through said aperture; second means responsive to a flight condition of said craft; and means controlled by both sensing means varying the suction applied to said aperture.

9. The apparatus of claim 8 wherein the first sensing means provides a fluid pressure output in accordance with the vortex rate of flow through the aperture and the second sensing device provides a fluid pressure output in accordance with the free stream velocity of the craft.

10. In a boundary layer control apparatus for an aircraft having an airfoil with an aperture therein to which suction may be applied for removal of the accelerated air particles from the boundary layer of such airfoil, a sensor responsive to the vortex flow through said aperture; a second sensor responsive to the free stream velocity of the craft; computing means for providing a function of the output of said two sensors; means for providing a desired function of the free stream velocity and vortex flow; and means controlled by the computing means and said last named means varying the suction applied to said aperture.

11. In a boundary layer control apparatus for an airfoil having at least one aperture in the surface thereof and means applying suction to said aperture, in combination: first sensing means responsive to the vortex flow through said aperture; second means responsive to the free stream velocity of the airfoil; computing means responsive to said two sensing means to provide an output in accordance with the ratio of signals from said two sensing means; means setting up a desired ratio between the vortex flow through said aperture and the free stream velocity; and means responsive to said last named means and said computing means varying the suction applied to said aperture, for applying a closed loop control through said first sensing means of the suction for said aperture.

12. In an airfoil boundary layer control apparatus for an airfoil having an aperture in the surface thereof and pumping means controlling the flow of air through such aperture through which vortex flow occurs which varies with the ratio of the free stream velocity to suction causing the flow of air through said aperture: sensor means responsive to vortex action through said aperture providing a net fluid pressure signal; sensing means responsive to the free stream velocity providing a second fluid pressure signal; computing means responsive to said two pressure signals; a device providing a pressure signal in accordance with a desired computation; and means controlled by the desired computation device and the computing device controlling the suction applied to said aperture.

13. In a boundary layer control apparatus for an airplane having at least one wing on each side of the fuselage thereof, each wing having an aperture therein to which suction may be applied for removal of decelerated fluid particles from the fluid boundary layer of said wing surface, a sensor responsive to vortex flow through each aperture; means for selecting the magnitude of suction to be applied to each aperture; and further means responsive to each sensor and to said selecting means for controlling the type of air flow over each wing surface.

14. The apparatus of claim 13, wherein the selecting means may oppositely determine the type of flow for each wing, whereby turbulent flow may be caused over one wing surface and laminar flow over the other surface.

References Cited by the Examiner

UNITED STATES PATENTS

| | | | |
|---|---|---|---|
| 2,925,231 | 2/1960 | Pfaff et al. | 244—42 |
| 3,097,817 | 7/1963 | Towzey | 244—15 |
| 3,142,457 | 7/1964 | Quenzler | 244—42 |
| 3,149,804 | 9/1964 | Litz | 244—42 |
| 3,172,621 | 3/1965 | Erwin | 244—44 |

FERGUS S. MIDDLETON, *Primary Examiner.*

BENJAMIN A. BORCHELT, *Examiner.*

R. F. STAHL, B. BELKIN, *Assistant Examiners.*